Jan. 3, 1933. L. ROUANET 1,892,966
BRAKING DEVICE
Filed Oct. 31, 1927  2 Sheets-Sheet 1
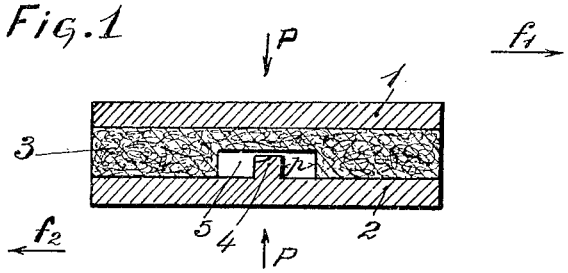
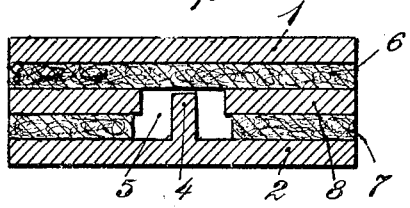
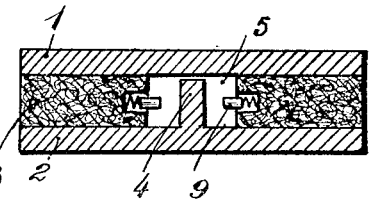
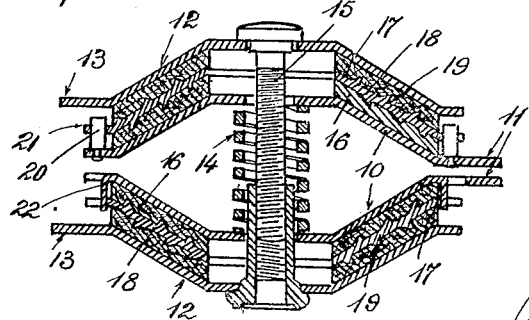
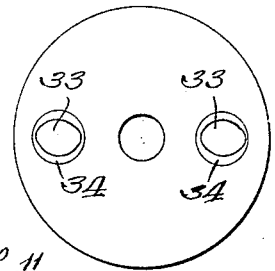
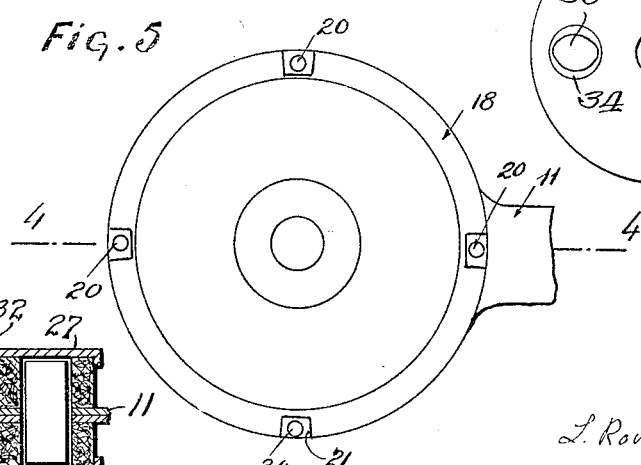
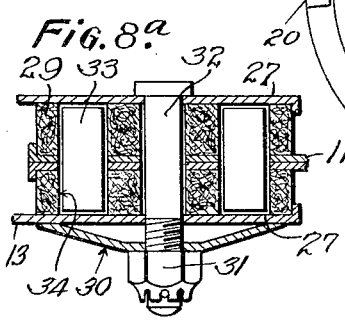
L. Rouanet
INVENTOR
By: Marks & Clerk
Attys.

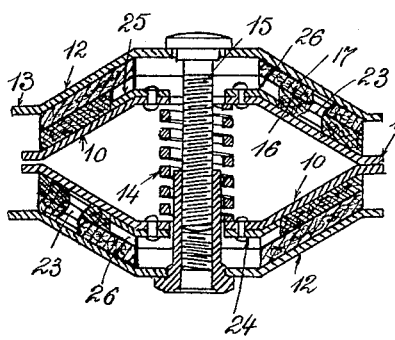
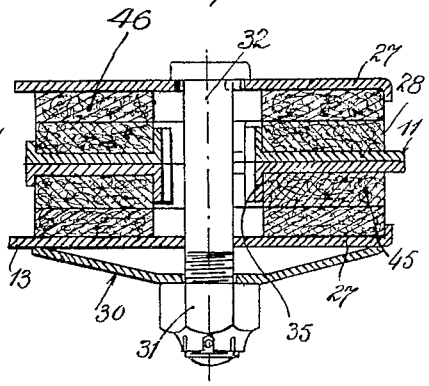
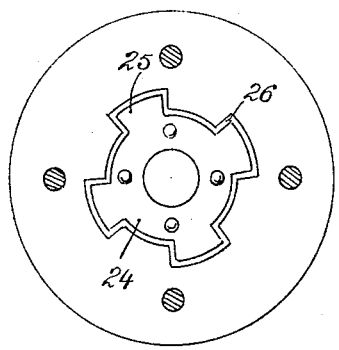
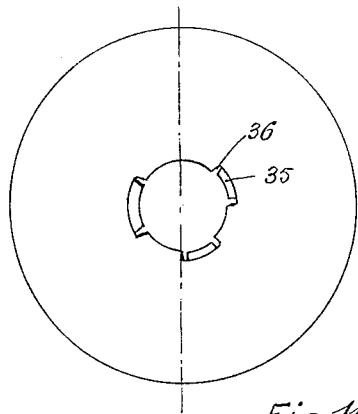
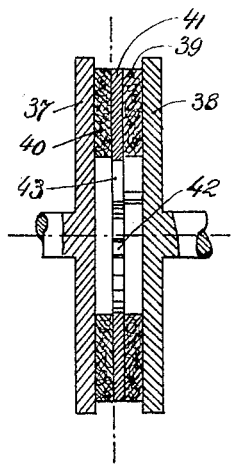
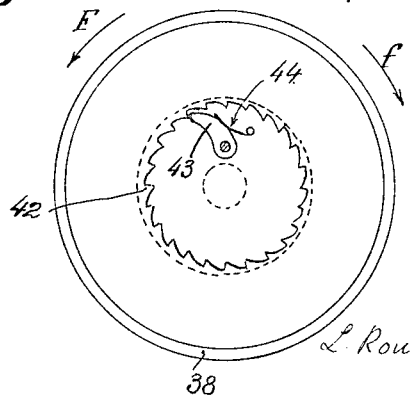

Patented Jan. 3, 1933

1,892,966

UNITED STATES PATENT OFFICE

LOUIS ROUANET, OF IVRY-PORT, FRANCE, ASSIGNOR, BY MESNE ASSIGNMENTS, TO HUBERT MENARD, OF ST. MAURICE, FRANCE

BRAKING DEVICE

Application filed October 31, 1927, Serial No. 230,121, and in France December 2, 1926.

The present invention relates to devices intended for braking the relative movements between two adjacent bodies. The invention is particularly applicable to shock absorbers used on automobile vehicles for braking the relative alternating movements which occur, when running, between the "suspended" and the "unsuspended" parts of the said vehicles.

Generally speaking the hitherto known devices operating in one or both directions, and with a constant or a variable effect, have been constructed so as to make use of the coefficient of friction between two materials, the braking action only depending on the applied force pressing together the materials in rubbing contact. In such devices, when the coefficient of friction is of low value, the braking device is insufficient for damping the large movements resulting from comparatively violent shocks. On the other hand, when the coefficient of friction is of high value, small forces are unable to cause relative movements between the surfaces in rubbing contact.

The present invention consists in using at least two friction devices having friction coefficients of different values between several materials in rubbing contact. The friction device having the smallest coefficient of friction serves for the braking of the short relative movements and the friction device having the greatest coefficient of friction serves for braking the large relative movements.

In order to permit satisfactory operation of the latter device, the device having a small coefficient of friction is put automatically out of action when the value of the relative movements exceeds a predetermined limit. Such a result may be obtained by coupling together the two materials between which the coefficient of friction has the lowest value, by means of any driving or engaging device.

A braking device according to the invention is so designed that when braking relative movements between the two moving bodies, different actions are obtained due to the differences between the coefficients of friction of the selected materials.

The simplest embodiment of the device according to the invention comprises a body of a suitable homogeneous material, located between two bodies of materials having different coefficients of friction, and a driving or engaging device coupling the central body to the body of material having the lowest coefficient of friction, as soon as the value of relative movement between these two bodies reaches a predetermined limit. Thus from the two bodies to be braked, one could for example be made of steel and the other of bronze, whereas the interposed body is made of a material containing asbestos.

The bodies, the relative movements of which are to be braked, could also be made of the same material, while the interposed material could be treated differently on its two faces by any suitable means in order to obtain different coefficients of friction. The interposed body could also be made of two parts having different coefficients of friction and moulded together, although the connection may be obtained by pasting, soldering, screwing, riveting, etc., with, if necessary, the provision between the two parts, of any connecting means such as grooves, serrations, keys, etc.

The interposed body could also be so composed that the parts in rubbing contact are separated by a different material able to absorb the shocks occurring during the coupling between the parts having the lowest coefficient of friction, buffers being used in certain cases for damping the said shocks.

The simplest application to shock absorbers of the scissor motion type used on automobile vehicles would be the interposition between the shells, connected by means of arms to the suspended and unsuspended parts of the vehicles respectively, of a body having a different coefficient of friction on each of its two faces in rubbing contact with an adjacent shell, a certain freedom of action being allowed at the side corresponding to the lowest coefficient of friction, and driving or engaging means on the same side acting only beyond the limit of such freedom of action.

In operation, the amount of pressure between the materials in rubbing contact insures the rotative coupling between the surfaces having the greatest coefficient of friction during the entire period of freedom of action between the surfaces in contact where the coefficient of friction has the lowest value. Beyond this limit, the driving or engaging means operate and the friction takes place between the surfaces having the greatest coefficient of friction.

The braking action having the smallest value takes place whatever may be the position imparted to the members about the average center of the reciprocating movements, and this is of special interest in the shock absorbers of the scissors motion type, i. e. of the type in which the moving parts have opposite angular displacements about a common center.

In such shock absorbers the members will adjust themselves in operation, so that the smallest braking effect will be automatically obtained on either side of the average center of spacing movements between the suspended and unsuspended parts of the vehicle, whatever may be the flexibility of the springs and the imposed load.

The engaging means for the smallest friction may be in the form of free wheels, ratchet wheels or equivalent devices. In such case, the smallest friction acts in one direction and the greatest friction in the other, giving a shock absorber with accentuated friction during the expansion of the springs.

Various forms of construction of the invention have been illustrated by way of example in the accompanying drawings in which:

Figs. 1, 2 and 3 show diagrammatically the principle of the invention.

Fig. 4 shows a section, taken along the line 4—4 in Fig. 5, of a shock absorber for automobile vehicles embodying the principle of the invention.

Fig. 5 is a plan view of this device, the upper shell and the central assembling bolt having been removed.

Figs. 6 and 7 are respectively similar views of another alternative form of shock absorber.

Figs. 8 and 9 are respectively sectional and plan views of another form of shock absorber.

Figs. 8$^a$ and 9$^a$ are respectively sectional and plan views of a further form of shock absorber.

Figs. 10 and 11 are respectively a sectional axial view and a side elevation with parts removed, of a further form thereof.

If two parts 1 and 2 (Fig. 1) are intended to undergo relative movements indicated by the arrows $f^1$ and $f^2$, the said relative movements can be braked by interposing, between the said parts 1 and 2, a material 3 acting by means of friction on the parts 1 and 2. In case the parts 1 and 2 are of the same nature, the coefficient of friction between the material 3 and each of the parts 1 and 2 is the same and depends on the pressure P exerted between the rubbing surfaces. If the coefficient of friction is low, the braking effect between the material 3 and the parts 1 and 2 is liable to be insufficient in case of violent forces, so that the relative movements between the parts 1 and 2 could reach exaggerated values. To the contrary, if the value of the coefficient of friction between the material 3 and the parts 1 and 2 is great, no relative movement may result between the parts 1 and 2 under the action of small forces, said parts 1, 2 and 3 operating as a rigid whole.

In order that the braking action may correspond to the forces tending to produce relative movements between the parts 1 and 2, and according to the invention, the materials of the parts 1 and 2 are selected so that they have different coefficients of friction with the material 3, and for example a coefficient of friction of low value between the material 3 and the part 2 and a coefficient of friction of high value between the material 3 and the part 1. Thus, for example, the part 3 may be composed of asbestos, the part 1 being of steel and the part 2 being of bronze. In this case, the braking action for the relative movements due to violent forces will take place between the surfaces of the material 3 and the part 1, provided that any relative motion between the part 2 and the material 3 be prevented on the occurrence of violent forces, so that the braking action may effectively be exerted between the part 1 and the material 3. For this purpose, the part 2 is provided with a driving or engaging device coupling the part 2 to the material 3 as soon as the relative movement between the parts 1 and 2 reaches a predetermined value. In the diagrammatical example shown in Fig. 1, the part 2 is provided with a lug 4 moving in a groove 5 cut in the material 3 on either side of the average position of the part 2. It will therefore be noted that as long as the relative movement between the parts 1 and 2 does not exceed a value $p$, either in the direction of the arrows $f^1$ and $f^2$ or in the opposite direction, the braking action is exerted between the part 2 and the material 3. On the other hand as soon as such value of relative movement is reached the lug 4 strikes against either the right or the left side of the groove 5, drawing the material 3 along with the part 2. From this moment, the braking action can no longer be exerted except between the part 1 and the material 3.

It is evident that the pressure P can be either constant or variable. In addition, instead of taking place only in the direction of the arrows $f^1$, $f^2$, the relative movements between the parts 1 and 2 can occur alternately in each direction, as in shock absorbers, for example.

The principle of using different coefficients of friction in order to obtain different braking effects can also be applied as shown in Fig. 2, by inserting, between the parts 1 and 2 both made of the same material—both steel or both bronze—for example, materials 6 and 7 having different coefficients of friction, the material 7 having for example a small coefficient of friction on the part 2, and the material 6 having a large coefficient of friction on the part 1. The materials 6 and 7 are coupled together by any suitable connecting means. The operation will be the same as in the example illustrated Fig. 1, and the braking action will be exerted between the part 2 and the material 7 for the small forces, and between the material 6 and the part 1 for the violent forces. As in the example shown in Fig. 1, the part 2 is provided with a lug 4, and the width of the groove 5 limits the value of the relative movements for which the braking action is exerted between the surfaces having a coefficient of friction of low value. At the moment the device with a low coefficient of friction is put out of action, i. e. at the moment of coupling of the interposed materials with the part 2, a shock occurs between the lug 4 and one of the faces of the groove 5. In order to resist the shock of engagement, a piece 8 of resisting material can be inserted between the materials 6 and 7, against which the lug 4 will strike at the moment of engagement. In this case, the piece 8 is secured to the materials 6 and 7 by any suitable connecting means.

In the example illustrated Fig. 2, the materials 6 and 7 located on each side of the piece 8, can be both of the same nature, and in this case the parts 1 and 2 will be made of different materials, one having a coefficient of friction of low value while the other has a coefficient of friction of high value with the material 6 and 7.

In order to avoid the use of the intermediate piece 8 of Fig. 2, and as illustrated in Fig. 3 which shows an arrangement similar to that of Fig. 1, buffers or suitable resilient devices 9, can be provided on the lateral faces of the groove 5 against which the lug 4 strikes at the moment of engagement, to prevent damages to the material 3.

In case the relative movements between the parts 1 and 2 occur alternately in each direction as in shock absorbers, and owing to the lower value of the coefficient of friction against the part 2, the reversal of movement takes place first between the said part 2 and the adjacent material. The smaller braking action is exerted independently of the position of the members about the average center of alternate movements.

Figs. 4 and 5 show the application of the above mentioned principle to a well known type of shock absorber for automobile vehicles. The inner shells 10 connected to one of the arms 11, which is for example secured to the unsuspended part of the vehicle, and the outer shells 12 connected to the arms 13, which is for example secured to the suspended part of the vehicle are pressed together by means of the inner spring 14 located around the central bolt 15. In this example the inner shells 10 and outer shells 12 are made of the same metallic material. Between the said shells two layers of friction materials are interposed, the one 16, having a comparatively small coefficient of friction with the shells 10, while the other, 17, has a coefficient of friction of relatively high value with the shells 12. The two said layers of material are connected together by means of the shells 18 having teeth 19 on their inner and outer faces. The damping of the small oscillatory movements is obtained between the surfaces in contact of the parts 10 and the material 16, while the damping of the large oscillatory movements is obtained between the surfaces in contact of the parts 12 and the material 17. The extent of the relative movements between the part 10 and the material 16 is limited by means of any suitable engaging device, which, in the embodiment of the Figs. 4 and 5, comprises, for example, pins 20 mounted on the outer edges of the shells 10 and moving in slots 21 provided in the outer edges of the shells 18. These pins 20 may conveniently be replaced by tongues 22, punched in the shells 10 and bent at right angles, as shown in the lower part of Fig. 4. As long as the value of the oscillatory movements between the shells 10 and 12 does not exceed the width of the slots 21, the braking action will be obtained between the inner shells 10 and the material 16 having a low coefficient of friction. As soon as the said value is exceeded, the pins 20 or tongues 22 will lock the shells 10, the material 16, the shells 18 and the material 17 together, and the braking action is thereupon obtained between the outer shells 12 and the material 17.

The form of construction shown in Figs. 6 and 7 is almost similar to that illustrated in Figs. 4 and 5. However, instead of using a shell 18 having teeth 19 for coupling together the materials 16 and 17, the latter are connected in the present example by means of rivets 23. Further, the engaging device, instead of being located at the periphery of the shells, is disposed towards the center of the shells. For this purpose discs 24 having radial teeth 25 are secured to the inner shells 10, said teeth 25 engaging slots 26 provided in the material interposed between the shells 10 and 12. The operation is obviously the same as in the case of the Figs. 4 and 5.

Figs. 8 and 9 show two alternative forms of shock absorbers, one located on the left hand side of the vertical axis and the other located on the right hand side of the said vertical axis. In these figures, the shock absorber comprises two outer discs 27 connected to one of the shock absorber arms 13, and two inner discs 28 connected to the other shock absorber arm 11. In the left hand alternative, the material of the inner discs 28 differs from that of the outer discs 27. Between each of the inner discs and each of the outer discs a material 29 is interposed the coefficient of friction of which has a low value with the material of the discs 28 but a high value with the material of the discs 27. A spring washer 30, the pressure of which can be adjusted by means of the nut 31 screwed onto the bolt 32, presses together the various parts of the shock absorber. For small oscillatory movements, the braking action is obtained between the inner discs 28 and the material 29, whereas for large oscillatory movements, the braking action is obtained between the outer discs 27 and the material 29. The extent of the movements corresponding to the braking action by the inner discs 28 is limited by means of elliptical pins 33 secured to the inner discs 28 and moving in hollows 34 provided in the material 29.

In the form of construction located to the right hand side of the vertical axis, the discs 27 and 28 are made of the same material, but two layers of different materials are interposed between the said discs, one of the interposed layers, 45, having a coefficient of friction of low value with the inner discs 28, and the other layer, 46, having a coefficient of friction of high value with the outer discs 27. The superimposed layers of material 45 and 46 are secured to each other. The extent of the relative movements between the discs 28 and the material 45 is limited by means of tongues 35 bent at right angles on the inner discs 28 and moving in slots 36 provided in the material 45. The operation of this shock absorber is quite similar to that of the preceding figures.

In the form of construction illustrated in Figs. 10 and 11, the discs 37 and 38, respectively secured to either of the two shock absorber arms, surround a material 39 in contact with the disc 38 and having, with the latter, a coefficient of friction of low value, and a material 40 in contact with the disc 37 and having with the latter a coefficient of friction of high value. The materials 39 and 40 are secured to an interposed circular plate or wheel 41 provided with ratchet teeth 42 on its inner edge. A pawl 43, actuated by a spring 44 and adapted to engage the teeth 42, is mounted on the disc 38. When the movements occur in the direction of the arrow $f$, the braking action will be freely exerted between the parts 38 and 39, since the pawl 43 will be able to pass freely from one tooth to another on the wheel 41. When the movements occur in the direction of the arrow F, the pawl 43 will prevent any movement of the disc 38 relative to the wheel 41 and to the materials 39 and 40 secured thereto. Consequently the braking action will be exerted between the disc 37 and the material 40. It will therefore be noted that by means of this device, the movements occurring in one direction are lightly braked, whereas the movements taking place in the other direction are strongly braked.

I claim:

1. A device for braking the relative movements between two moving bodies comprising at least two friction devices having different coefficients of friction and means enabling alternative action of either of the friction devices whereby one of the said friction devices is operated at a time.

2. A device for braking the relative movements between two moving bodies comprising at least two friction devices having different coefficient of friction and means for coupling together the relatively movable members of the friction device having the lowest coefficient of friction.

3. A braking device for damping the relative movements betwen two moving bodies, comprising a member associated to one of the moving bodies and having a frictional surface thereon, another member associated to the other moving body and having a frictional surface thereon, an intermediate member having a surface complementary to the first named frictional surface and forming therewith a friction device and a surface complementary to the second named frictional surface and forming therewith a friction device, one of the said friction devices having a coefficient of friction of lower value and means to lock against relative movement the elements of said last named friction device.

4. A braking device comprising a member having a friction surface, another member also havng a friction surface, an intermediate member having friction surfaces complementary to the friction surfaces of the first and second named members, whereby at least two friction devices are obtained and said friction devices having different coefficients of friction and means secured to the member forming part of the friction device having the coefficient of friction of lower value and acting on the intermediate member for coupling together the elements of the last named friction device.

5. A device for braking the relative movements between two moving bodies comprising at least two friction devices having different coefficients of friction and each formed of at least two relatively movable elements and means for coupling together the elements of the said friction devices starting with those of the friction device having the lowest coefficient of friction.

6. A device for braking the relative movements between two moving bodies comprising at least two friction devices having different coefficients of friction and means enabling successive actions of the friction device having the lowest coefficient of friction and of the friction device having the higher coefficient of friction in both directions of movement.

7. A device for braking the relative movements between two moving bodies comprising at least two friction devices having different coefficients of friction and means enabling successive actions of the friction devices by positively locking together the members of one of the friction devices after a time of displacement.

8. A device for braking the relative movements between two moving bodies comprising at least two friction devices having different coeffcients of friction and means enabling successive actions of the friction devices by coupling together the relatively movable members of the friction device having the lowest coefficient of friction after a time of displacement.

9. A device for braking the relative movements between two moving bodies comprising at least two friction devices having different coefficients of friction and the same area and means enabling alternative action of the friction devices whereby one of the said friction devices is operated at a time.

10. A device for braking the relative movements between two moving bodies comprising at least two friction devices having different coefficients of friction and the same area and means enabling the two friction devices to be operated successively one at a time on a part of the total displacement in both directions.

11. A braking device for damping the relative movements between two moving bodies, comprising a member associated to one of the moving bodies and having a frictional surface thereon, another member associated to the other moving body and having a frictional surface thereon, an intermediate member having a surface complementary to the first named frictional surface and forming therewith a friction device and a surface complementary to the second named frictional surface and forming therewith a friction device, all the said frictional and complementary surfaces being in permanent engagement with each other and one of the said friction devices having a coefficient of friction of lower value, and means to lock against relative movement the members of the said last named friction device.

12. A braking device comprising a member having a friction surface another member also having a friction surface, an intermediate member having friction surfaces complementary to the friction surfaces of the first and second named members, whereby at least two friction devices are obtained and said friction devices being of the same area and having different coefficients of friction and means secured to the member forming part of the friction device having the coefficient of friction of lower value and acting on the intermediate member for coupling together the members of the last named friction device after a time of operation.

13. A device for braking the relative movements between two moving bodies comprising at least two friction devices having different coefficients of friction and each formed of at least two relatively movable members and means for coupling together the members of the said friction devices starting with those of the friction device having the lowest coefficient of friction and after a time of operation of this latter friction device.

LOUIS ROUANET.